US012573197B2

(12) United States Patent
Janniello

(10) Patent No.: US 12,573,197 B2
(45) Date of Patent: Mar. 10, 2026

(54) INTELLIGENT ENVIRONMENTAL AND VIDEO PRODUCTION DRONE

(71) Applicant: James P Janniello, Sarasota, FL (US)

(72) Inventor: James P Janniello, Sarasota, FL (US)

( * ) Notice: Subject to any disclaimer, the term of this patent is extended or adjusted under 35 U.S.C. 154(b) by 219 days.

(21) Appl. No.: 18/317,901

(22) Filed: May 15, 2023

(65) Prior Publication Data

US 2023/0368522 A1     Nov. 16, 2023

Related U.S. Application Data

(60) Provisional application No. 63/342,596, filed on May 16, 2022.

(51) Int. Cl.
| | |
|---|---|
| *G06V 20/17* | (2022.01) |
| *B64U 20/87* | (2023.01) |
| *G06V 40/20* | (2022.01) |
| *B64U 101/30* | (2023.01) |

(52) U.S. Cl.
CPC ............. *G06V 20/17* (2022.01); *B64U 20/87* (2023.01); *G06V 40/23* (2022.01); *B64U 2101/30* (2023.01); *G06V 2201/07* (2022.01)

(58) Field of Classification Search
CPC .... G06V 20/17; G06V 40/23; G06V 2201/07; G06V 40/10; B64U 20/87; B64U 2101/30; B64C 39/024
USPC ........................................................ 382/103
See application file for complete search history.

(56) References Cited

U.S. PATENT DOCUMENTS

| | | | |
|---|---|---|---|
| 10,118,697 B2 | 11/2018 | Weissenberg |
| 10,747,997 B2 | 8/2020 | Janniello |
| 11,042,741 B2 | 6/2021 | Janniello |
| 2012/0242501 A1 | 9/2012 | Tran |
| 2016/0016664 A1 | 1/2016 | Basuni |
| 2016/0299233 A1 | 10/2016 | Levien |
| 2017/0029101 A1 | 2/2017 | Weissenberg |
| 2017/0113799 A1 | 4/2017 | Kovac |
| 2017/0240280 A1 | 8/2017 | Karabed |
| 2018/0294871 A1 | 10/2018 | Kosseifi |

(Continued)

FOREIGN PATENT DOCUMENTS

| | | | | | |
|---|---|---|---|---|---|
| CN | 109828596 | * | 5/2019 | ............. | H04N 7/181 |
| KR | 102130261 | * | 7/2020 | ........... | B64C 39/024 |

(Continued)

OTHER PUBLICATIONS

Motlagh et al., Low-Altitude Unmanned Aerial Vehicles-Based Internet of Things Services: Comprehensive Survey and Future Perspectives, 2016, IEEE, p. 899-922 (Year: 2016).

(Continued)

*Primary Examiner* — Jerome Grant, II

(57) ABSTRACT

Methods, systems, and apparatus for an intelligent environmental drone are described. The aeronautical drone includes an environmental condition generator. A camera system is configured to capture an image of an environment near the aeronautical drone and an image and sensor processing module is configured to identify a target entity by processing the image captured by the camera system. A tracking and guidance module is configured to track the target entity and determine a location for the aeronautical drone to create a generated condition area of a specified size and location and to position the generated condition area around the target entity.

19 Claims, 7 Drawing Sheets

(56)             References Cited

U.S. PATENT DOCUMENTS

| | | |
|---|---|---|
| 2019/0002103 A1 | 1/2019 | Gomez Gutierrez |
| 2019/0220648 A1 | 7/2019 | Janniello |
| 2019/0251752 A1 | 8/2019 | Rodriguez, II |
| 2020/0380241 A1 | 12/2020 | Janniello |
| 2020/0400635 A1* | 12/2020 | Potyrailo ............. G05D 1/0206 |
| 2021/0341128 A1* | 11/2021 | Abron ..................... G09F 19/12 |
| 2022/0383762 A1* | 12/2022 | Ali ........................... G08G 5/22 |
| 2024/0288335 A1* | 8/2024 | Kohno ............... G01M 11/0207 |

FOREIGN PATENT DOCUMENTS

| | | | | |
|---|---|---|---|---|
| KR | 20200098067 | * | 8/2020 | ............... B64D 7/02 |
| WO | WO2017169516 | * | 10/2017 | ........... G03B 15/006 |
| WO | WO2022061508 | * | 3/2022 | ............. G01C 21/20 |
| WO | WO2022250860 | * | 12/2022 | ........... G08G 5/0013 |

OTHER PUBLICATIONS

Borky, Payload technologies and applications for uninhabited air vehicles (UAVs), 1997, IEEE, p. 1-17 (Year: 1997).
Jordan et al., State-of-the-art technologies for UAV inspections, 2017, IEEE, p. 151-164 (Year: 2017).
Gatteschi et al., New Frontiers of Delivery Services Using Drones: A Prototype System Exploiting a Quadcopter for Autonomous Drug Shipments, 2015, IEEE, p. 920-927 (Year: 2015).
Yapp et al., UAV as a service: Enabling on-demand access and on-the-fly re-tasking of multi-tenant UAVs using cloud services, 2016, IEEE, p. 1-8 (Year: 2016).

* cited by examiner

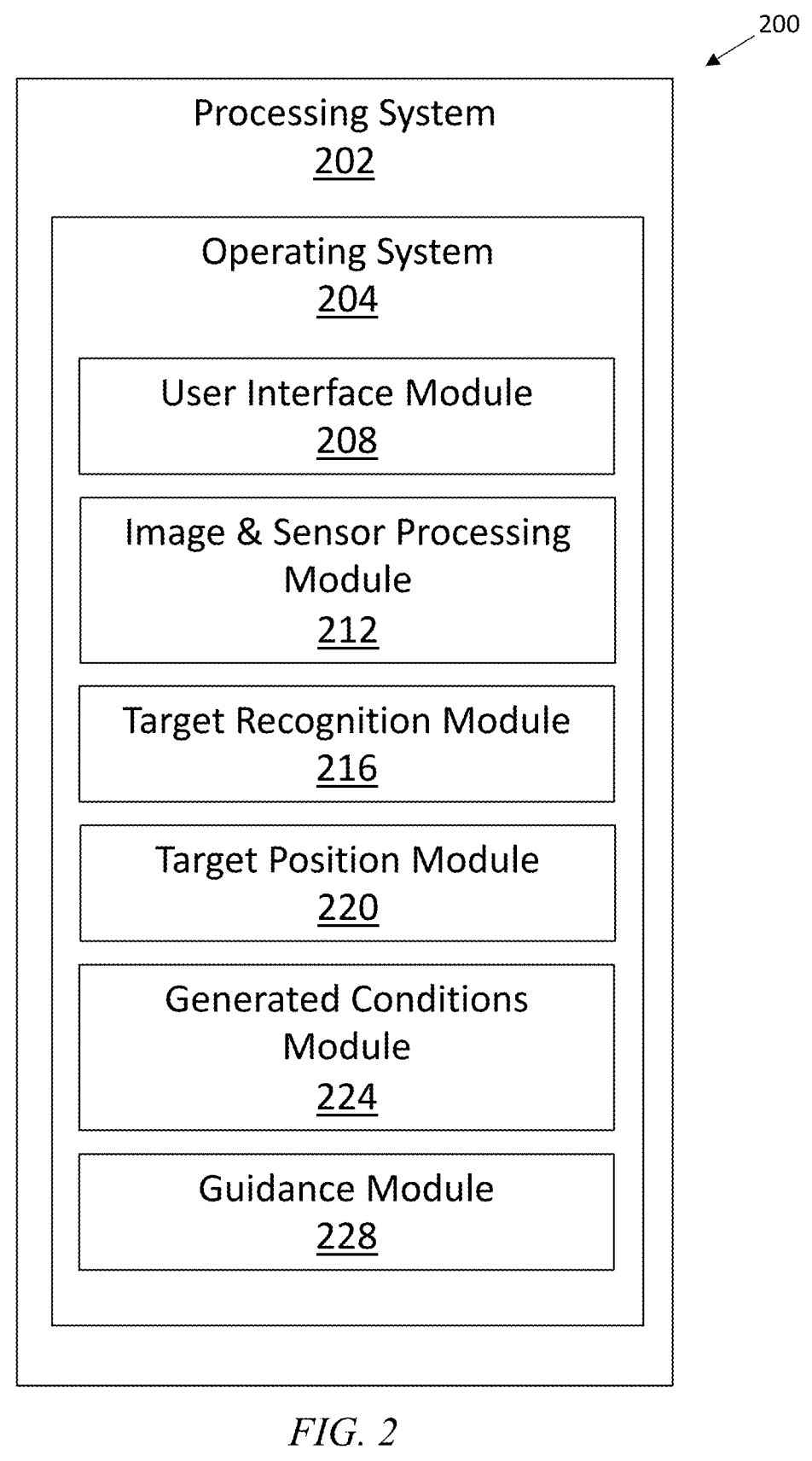

200

Processing System
202

Operating System
204

User Interface Module
208

Image & Sensor Processing Module
212

Target Recognition Module
216

Target Position Module
220

Generated Conditions Module
224

Guidance Module
228

*FIG. 2*

INTELLIGENT ENVIRONMENTAL AND VIDEO PRODUCTION DRONE

TECHNICAL FIELD

The present application relates generally to the electrical, electronic, and computer arts, and more specifically, in one example, to an intelligent drone for generating environmental conditions.

BACKGROUND

Outdoor media productions, such as film-making, television production, and the like, often require the altering or generation of specific environmental conditions. For example, natural light may need to be filtered, projected or otherwise controlled. Artificial light may need to be generated in a controlled manner. Rain and/or wind may need to be controlled, generated or both. Moreover, these conditions may need to be created at a specified location(s), and that location may move during a production. For example, as an actor and/or object moves across a landscape, it may be desirable to filter the light that is illuminating the actor and/or an object, another actor(s) and/or object(s), and the like. Similarly, it may be desirable for a light rain to encompass and follow the actor. In the case of lighting, the source of the light, such as a spotlight or floodlight, may be in motion, potentially at the same time as the motion of the actor.

BRIEF DESCRIPTION OF THE DRAWINGS

Some embodiments are illustrated by way of example and not limitation in the figures of the accompanying drawings, in which:

FIG. 2 is a block diagram of an example apparatus for controlling an aeronautical drone, in accordance with an example embodiment;

DETAILED DESCRIPTION

Figures 1, 3A:
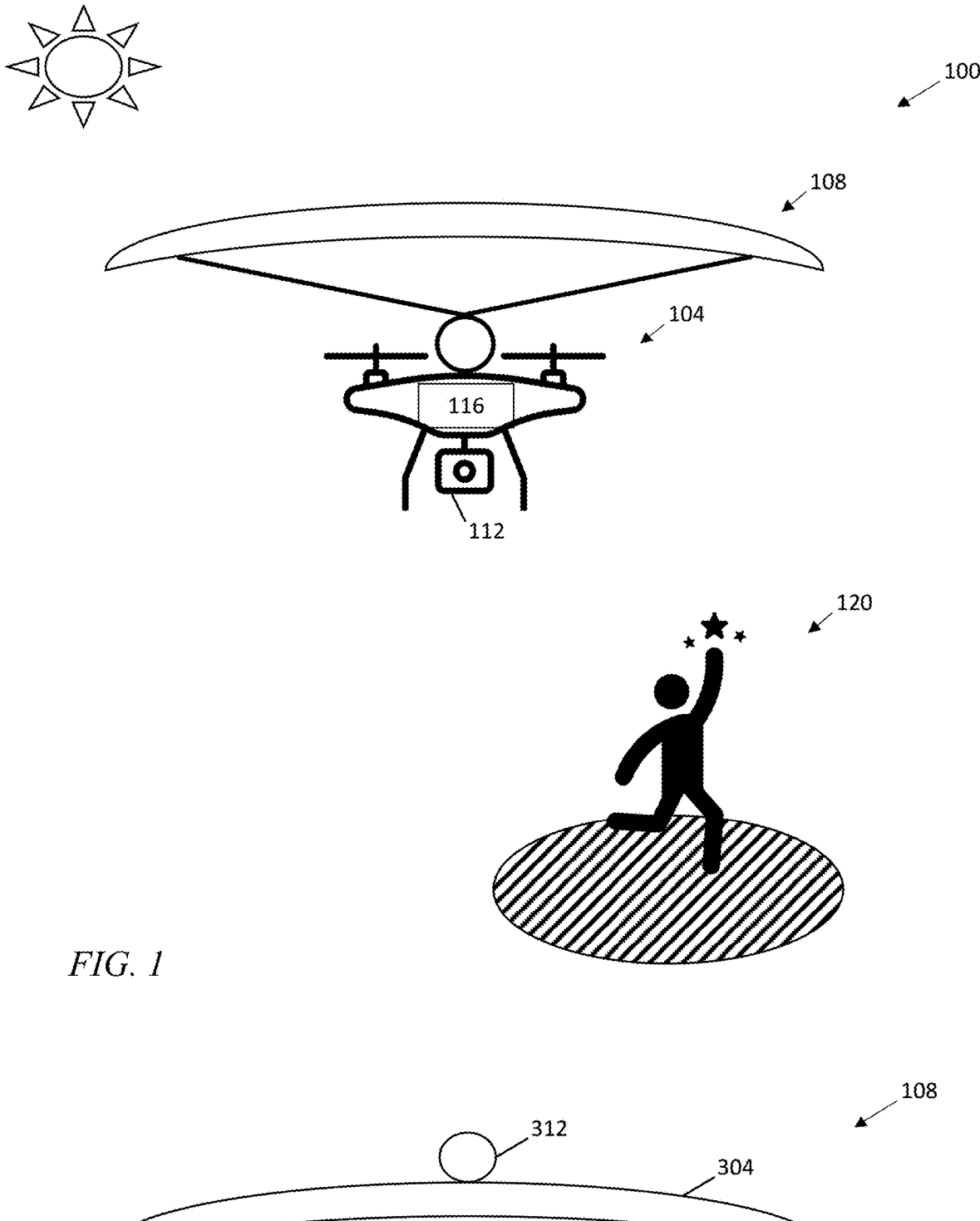
FIG. 1 is a block diagram of an example intelligent protective drone system, in accordance with an example embodiment.
FIG. 3A is a diagram of an example environmental light filter for an aeronautical drone, in accordance with an example embodiment.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other example embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, apparatus, and systems for generating environmental conditions (referred to as "conditions" herein) are disclosed. In one example embodiment, an aeronautical drone is configured to generate environmental conditions for a given geographical area (known as a "generated condition area" herein). The drone is also configured to track and follow an individual (a human being), an object, a piece of equipment, or any combination thereof (known as a "target entity(ies)" herein) and thereby create the conditions for the target entity(ies). The drone may be configured to create environmental conditions, such as rain, snow, fog, wind, filtered and/or reflected rays of the sun, artificial light, and the like.

The drone uses one or more techniques to perform the tracking and following operations. For example, a camera mounted on the drone may be used to track the target entity(ies). For example, the drone may be trained to recognize a particular object in an image (such as a golf club or a car), a person or an element (such as a particular clothing material or facial feature) associated with the person, a graphical symbol or image attached to an individual or an object, and the like (known collectively as a target feature herein). The drone may track the target entity(ies) in a live image that is captured by the camera system.

The drone is positioned in an area surrounding the target entity(ies), such as directly above the target entity(ies), to appropriately position the generated condition area. The drone may be positioned in the path of the sun's rays such that the target entity(ies) resides fully or partially in the shade created by the drone's light filter shield. Similarly, artificial light may be used to create different lighting effects from an onboard light source. In addition, the drone may use light meters, the camera system, and the like to monitor and adjust the lighting, whether natural, artificial or both, for a specified effect. The light meters, cameras or both may be onboard the drone, located external to the drone (with communication via wireless links) or both. If rain is falling in the wind, the drone may be positioned such that the target entity(ies) are fully or partially residing in the dry (or relatively dry) area created by the drone's conditions generator. If the sun is directly overhead of the target entity(ies) or rain is falling in an environment with no wind, the drone may be positioned directly above the target entity(ies). If rain is not falling but is desired, the drone's rain generator sprays rain across the generated condition area to simulate rain.

In one example embodiment, the drone is manually controlled by a user to initially position the drone directly above or near the target entity(ies). Once the drone identifies and locks onto the target entity(ies), the drone assumes control of its location and maintains an appropriate position and distance in relation to the target entity(ies), as described more fully below by way of example.

FIG. 1 is a block diagram of an example intelligent protective drone system 100, in accordance with an example embodiment. In one example embodiment, the intelligent protective drone system 100 comprises an aeronautical drone 104, an environmental condition generator 108, a camera system 112, and a tracking and guidance module 116.

The aeronautical drone 104 is a drone whose location is controlled in relation to the target entity(ies), such as an object or an individual. The location may be specified by an altitude or height above the target entity(ies), a geographical location, and the like. The geographical location may be defined by latitude and longitude coordinates, a position relative to the target entity(ies) (such as 15 feet northeast of the target entity(ies) and twelve feet above the target entity(ies)), Global Positioning System (GPS) coordinates, and the like. In one example embodiment, the location of the aeronautical drone 104 is controlled by dynamically and incrementally adjusting the location of the aeronautical drone 104 based on, for example, an image captured by the camera system 112 in order to properly position the generated condition area.

The location may also be adjusted to create a generated condition area 120 of a specified size and location. The size and location may be achieved using the dynamic and incremental technique described above. The generated condition area 120 may be, for example, the area of filtered light, artificial light or both created by the environmental condition generator 108 and may be positioned to surround the target entity(ies) or illuminate a particular side(s) of the target entity(ies). The size of the generated condition area created by the environmental condition generator 108 may, for example, be increased by increasing the altitude of the aeronautical drone 104 and may, for example, be decreased by decreasing the altitude of the aeronautical drone 104. The size of the generated condition area created by the environmental condition generator 108 may be increased or decreased by setting parameters of the environmental condition generator 108. For example, light filters may be adjusted based on measurements of reflected light to alter the intensity of the light, bandwidth of the light, location of the light, and the like. Rain may be adjusted via adjustments of a nozzle, such as adjustments to the direction, volume of water, and the like.

The environmental condition generator 108 alters and/or creates specified environmental conditions, such as filtering the rays of the sun, generating artificial light, generating a breeze, spraying simulated rain, spreading simulated fog, and the like, as described more fully below by way of example in conjunction with FIGS. 3A-3D. The environmental condition generator 108 may be rotated, tilted, or both, for example, to change the size, change the location, change the environmental effect or any combination of the above for the generated condition area 120 created by the environmental condition generator 108.

The camera system 112 captures images from the aeronautical drone 104 and provides the images to the tracking and guidance module 116 for processing. The images are also provided for control of the environmental condition generator 108, as described more fully below.

The tracking and guidance module 116 detects the location of the target entity(ies) and the generated condition area 120 provided by the environmental condition generator 108. For example, the tracking and guidance module 116 may obtain the GPS coordinates of the target entity(ies) directly from the target entity(ies) or another entity (such as a smartphone located near the target entity(ies)), may perform image processing on an image of the target entity(ies) to detect a target feature(s) or other distinguishing feature(s) of the target entity(ies), may track a radio beacon emitted by the target entity(ies), and the like. Similarly, the tracking and guidance module 116 may perform image processing on an image to detect an area of filtered sunlight provided by the environmental condition generator 108, an area of simulated rainfall provided by the environmental condition generator 108, an area of fog provided by the environmental condition generator 108, an area of simulated wind provided by the environmental condition generator 108, and the like.

The tracking and guidance module 116 also analyzes the location of the target entity(ies) and the location of the generated condition area 120 of the environmental condition generator 108 and determines the appropriate location for the aeronautical drone 104. For example, a new position and altitude may be determined for the aeronautical drone 104 to position the filtered light created by the environmental condition generator 108 around the target entity(ies) (such that the target entity(ies) is located, for example, within the center of the shadow created by the environmental condition generator 108 based on the geographical location of the shadow and the geographical location of the target entity(ies)). Similarly, a new position and altitude may be determined for the aeronautical drone 104 to create a generated condition area 120 of the environmental condition generator 108 that is of a specified size, of a specified lighting effect, and the like. For example, a light meter on the aeronautical drone 104 may be used to monitor the filtered light being reflected from the generated condition area 120 and the lighting effect may be adjusted as needed, such as by repositioning the aeronautical drone 104, reconfiguring the environmental condition generator 108, and the like. The tracking and guidance module 116 provides instructions to the aeronautical drone 104 to control the position of the aeronautical drone 104 in relation to the target entity(ies). In one example embodiment, the tracking and guidance module 116 provides instructions for tilting and rotating the environmental condition generator 108 in order to create the generated condition area 120 at the appropriate location.

In one example embodiment, the tracking and guidance module 116 instructs the aeronautical drone 104 to move incrementally in small steps (such as horizontal steps of one to three feet and/or vertical steps of one to three feet) until the target entity(ies) is properly affected by the generated condition area 120. The position of the target entity(ies) in relation to the generated condition area 120 may be evaluated after each move.

In one example embodiment, the tracking and guidance module 116 includes a processor (e.g., a central processing unit (CPU), a graphics processing unit (GPU), and the like) and a memory, which communicate with each other via a bus. The tracking and guidance module 116 may further include a video display (e.g., a plasma display, a liquid crystal display (LCD), and the like). The tracking and guidance module 116 may also include an alphanumeric input device (e.g., a keyboard), a remote user interface (UI) navigation device (e.g., a mouse and/or touch screen), a drive unit, a signal generation device (e.g., a speaker), and a network interface device.

The drive unit, such as a removable drive unit, includes a machine-readable medium on which is stored one or more sets of instructions and data structures embodying or utilized by any one or more of the methodologies or functions described herein. The instructions may also reside, completely or at least partially, within the memory and/or within the processor during execution thereof by the computer processing system. The instructions may further be transmitted or received over a network via the network interface device utilizing any one of a number of well-known transfer protocols (e.g., Hypertext Transfer Protocol (HTTP)).

The network (not shown) may be a local area network (LAN), a wireless network, a metropolitan area network (MAN), a wide area network (WAN), a network of interconnected networks, the public switched telephone network (PSTN), an electrical power-based network (such as a network using the X10 protocol), and the like. Communication links include, but are not limited to, WiFi (e.g., IEEE 802.11), Bluetooth, Universal Serial Bus (USB), and the like. In one example embodiment, the network may comprise one or more routers and/or device switches.

FIG. 2 is a block diagram of an example apparatus 200 for controlling the aeronautical drone 104, in accordance with an example embodiment. In one example embodiment, the apparatus 200 may serve as the tracking and guidance module 116.

The apparatus 200 is shown to include a processing system 202 that may be implemented on a server, client, or other processing device that includes an operating system 204 for executing software instructions. In accordance with an example embodiment, the processing system 202 includes a user interface module 208, an image and sensor processing module 212, a target recognition module 216, a target position module 220, a generated conditions module 224, and a guidance module 228.

The user interface module 208 provides an interface for configuring the intelligent protective drone system 100. For example, a user may view an image captured by the camera system 112 via the user interface module 208 and may position the aeronautical drone 104 above the target entity(ies) to allow the tracking and guidance module 116 to lock onto the target entity(ies). A user interface generated by the user interface module 208 and displayed, for example, by the mobile device of FIG. 6 may be used to monitor and control the position of the aeronautical drone 104, as described more fully below by way of example in conjunction with FIG. 5. The user interface module 208 also provides an interface for configuring and monitoring the effects generated by the environmental condition generator 108. For example, the effect generated by the environmental condition generator 108 may be captured by the camera system 112, displayed via the user interface module 208, and manually adjusted by the user.

The image and sensor processing module 212 processes images obtained from the camera system 112, the sensors 344, or both to identify target entity(ies) within the obtained image. A corresponding size and location of the identified target entity(ies) may also be determined. The image and sensor processing module 212 also identifies the location of the generated condition area 120 within the image, e.g., the location of filtered light provided by the environmental condition generator 108, the location of simulated rain provided by the environmental condition generator 108, and the like. In addition, the image and sensor processing module 212 monitors, identifies and characterizes the effects generated by the environmental condition generator 108. For example, the image and sensor processing module 212 may analyze an image to characterize a type of lighting effect, an intensity of a lighting effect, a location or intensity of rain, a location or intensity of wind, and the like. The sensors 344, such as light meters, may also be utilized by the image and sensor processing module 212 to characterize the type of lighting effect, the intensity of a lighting effect, and the like.

The target recognition module 216 compares the objects and individuals identified in the image to the target entity(ies) to identify the target entity(ies). The target recognition module 216 may also determine the relative geographical location of the target entity(ies) in relation to the aeronautical drone 104 or a geographical landmark, such as a street corner. In one example embodiment, GPS coordinates of the target entity(ies) may be received by the target recognition module 216.

The generated conditions module 224 determines the relative geographical location and size of the generated condition area 120 provided by the environmental condition generator 108, e.g., the rainfall area provided by the environmental condition generator 108 and the like. The geographical location of the generated condition area 120 may be determined in relation to the target entity(ies). The generated conditions module 224 also monitors the effect generated by the generated condition area 120 (such as detecting and characterizing a lighting effect generated by an artificial light source) via the image and sensor processing module 212 and can dynamically adjust the parameters of the generated condition area 120 to adjust the generated effect. For example, the intensity of light generated by the light source can be incrementally adjusted until the desired effect is attained.

The target position module 220 determines a new position and altitude for the aeronautical drone 104 based on the location of the generated condition area 120 and the location of the target entity(ies). The guidance module 228 issues instructions to move the aeronautical drone 104 to the new position and altitude. In one example embodiment, the location of the aeronautical drone 104 is controlled by dynamically and incrementally adjusting the location of the aeronautical drone 104 based on an image captured by the camera system 112 in order to position the generated condition area 120 around the target entity(ies), to attain a desired effect generated by the environmental condition generator 108, or both.

FIG. 3A is a diagram of a first example environmental condition generator 108 for the aeronautical drone 104, in accordance with an example embodiment. In general, the environmental condition generator 108 is comprised of one or more functional units. A light filtering unit 304 may be manufactured from a lightweight light filtering material. A supporting structure 308, such as an inflatable ring, metal or plastic spokes, and the like, may be designed to conform the lightweight material to a particular shape, such as that of a conventional circular disk. An adjustable pivot lever 312 or similar mechanism may be used to rotate the supporting structure 308 to a specified direction and to tilt the supporting structure 308 at a specified angle, as illustrated in FIG. 1. In one example embodiment, the opacity of the light filtering material may be adjusted by, for example, overlapping additional layers of the light filtering material.

Figure 3B:
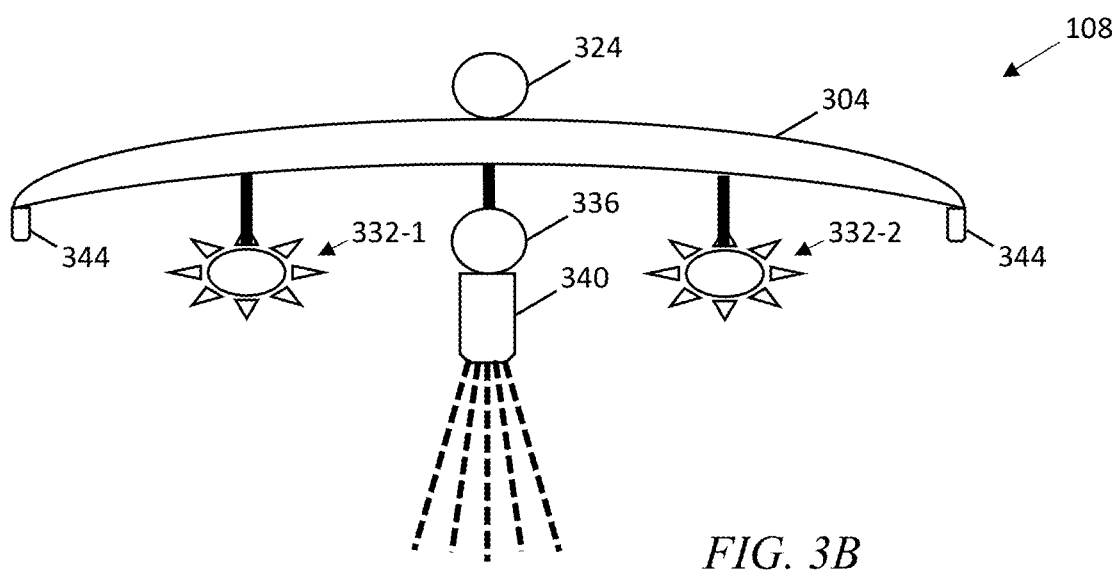
FIG. 3B is a diagram of a second example of the environmental condition generator for the aeronautical drone, in accordance with an example embodiment.

FIG. 3B is a diagram of a second example of the environmental condition generator 108 for the aeronautical drone 104, in accordance with an example embodiment. A ball joint 324 enables the environmental condition generator 108 to swivel in all directions for proper orientation of the functional units. In one example embodiment, each functional unit incorporates a ball joint to individually orient the corresponding functional unit. For example, a spraying unit 340 includes a ball joint 336. The spraying unit 340 includes a fluid tank, a pump, and an adjustable spray nozzle for creating artificial rain, artificial fog, and the like. The fluid tank holds a fluid, such as water, for spraying on and/or near the entity(ies) affected by the environmental condition generator 108 (referred to as the generated condition area 120 herein).

In one example embodiment, one or more versatile functional units 332-1, 332-2 generate one or more environmental effects. For example, each versatile functional unit 332-1, 332-2 may be configured to generate a desired lighting effect on and/or near the affected entity(ies), generate an artificial breeze via an integrated fan, or both. Sensors 344, such as light meters, cameras, and the like, may be included as a component(s) of the versatile functional unit 332-1, 332-2, may be otherwise attached to the environmental condition generator 108 or the aeronautical drone 104, or may be otherwise located nearby the affected entity(ies). The sensors 344 may be used to adjust parameters of the aeronautical drone 104, such as adjusting the light source of the versatile functional unit 332-1, 332-2, the integrated fan of the versatile functional unit 332-1, 332-2, the spraying unit 340, and the like, by, for example, analyzing the lighting effect captured by the camera(s) and/or light meters, analyzing a wind and/or rain effect captured by the camera(s), and the like. As with the spraying unit 340, each versatile functional unit 332-1, 332-2 may incorporate a ball joint or other mechanism to individually orient the corresponding versatile functional unit 332-1, 332-2. An adjustable light source of the versatile functional unit 332-1, 332-2 enables the brightness, mode (such as spotlight or floodlight), and other parameters to be adjustable. Similarly, the wind direction, wind speed, and other parameters of the wind generator of the versatile functional unit 332-1, 332-2 may be adjustable.

Figure 3C:
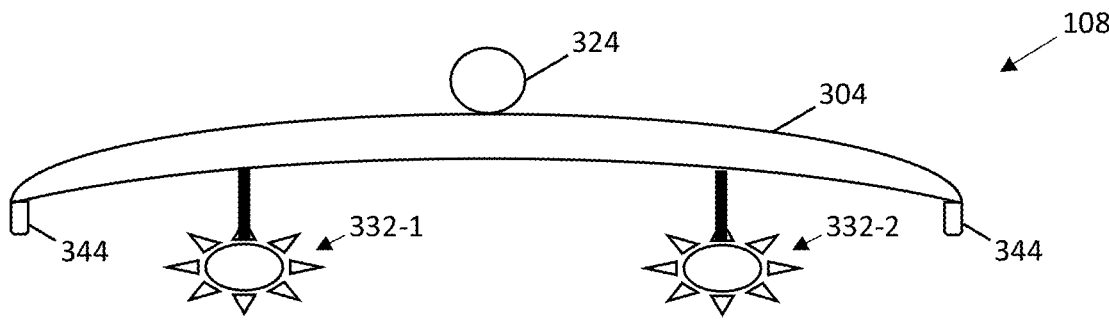
FIG. 3C is a diagram of a third example of the environmental condition generator for the aeronautical drone, in accordance with an example embodiment.

FIG. 3C is a diagram of a third example of the environmental condition generator 108 for the aeronautical drone 104, in accordance with an example embodiment. In one example embodiment, as described above, the ball joint 324 enables the environmental condition generator 108 to swivel in all directions for proper orientation of the functional units and each functional unit may incorporate a ball joint to individually orient the corresponding functional unit. In the example embodiment of FIG. 3C, the versatile functional units 332-1, 332-2 may be configured to generate a desired lighting effect on and/or near the affected entity(ies), generate an artificial breeze via an integrated fan, or both. As described above, sensors 344 may be included as a component(s) of the versatile functional unit 332-1, 332-2, may be otherwise attached to the environmental condition generator 108 and/or the aeronautical drone 104, or may be otherwise located nearby the affected entity(ies).

Figure 3D:
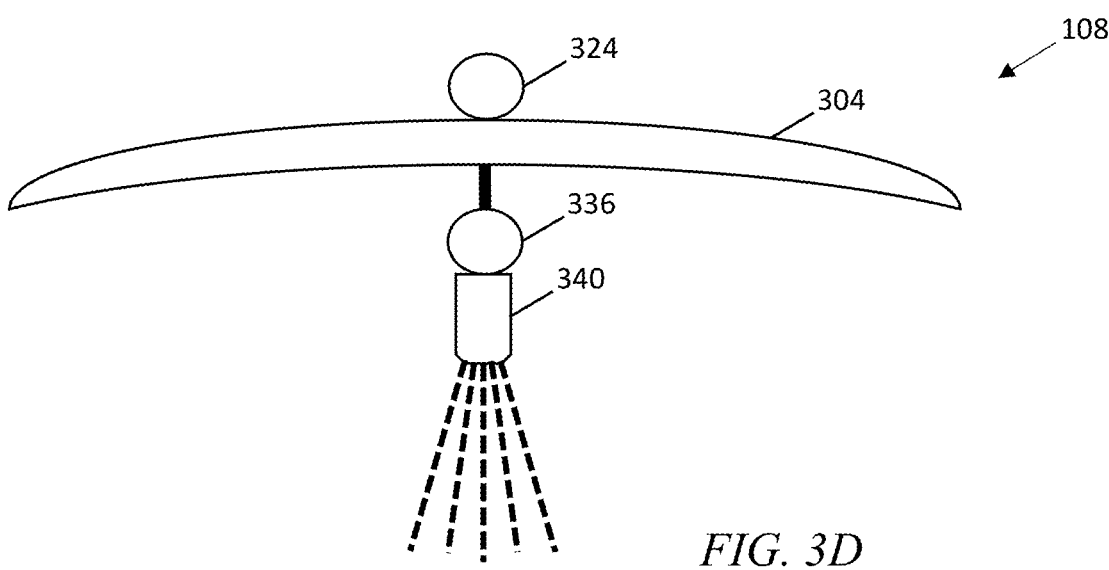
FIG. 3D is a diagram of a fourth example of the environmental condition generator for the aeronautical drone, in accordance with an example embodiment.

FIG. 3D is a diagram of a fourth example of the environmental condition generator 108 for the aeronautical drone 104, in accordance with an example embodiment. In one example embodiment, the ball joint 324 enables the environmental condition generator 108 to swivel in all directions for proper orientation of the functional units and each functional unit incorporates a ball joint to individually orient the corresponding functional unit. In the example embodiment of FIG. 3D, the spraying unit 340 includes the ball joint 336. The spraying unit 340 includes a fluid tank, a pump, and an adjustable spray nozzle for creating artificial rain, artificial fog, and the like. The fluid tank holds a fluid, such as water, for spraying on and/or near the affected entity(ies).

Figure 4:
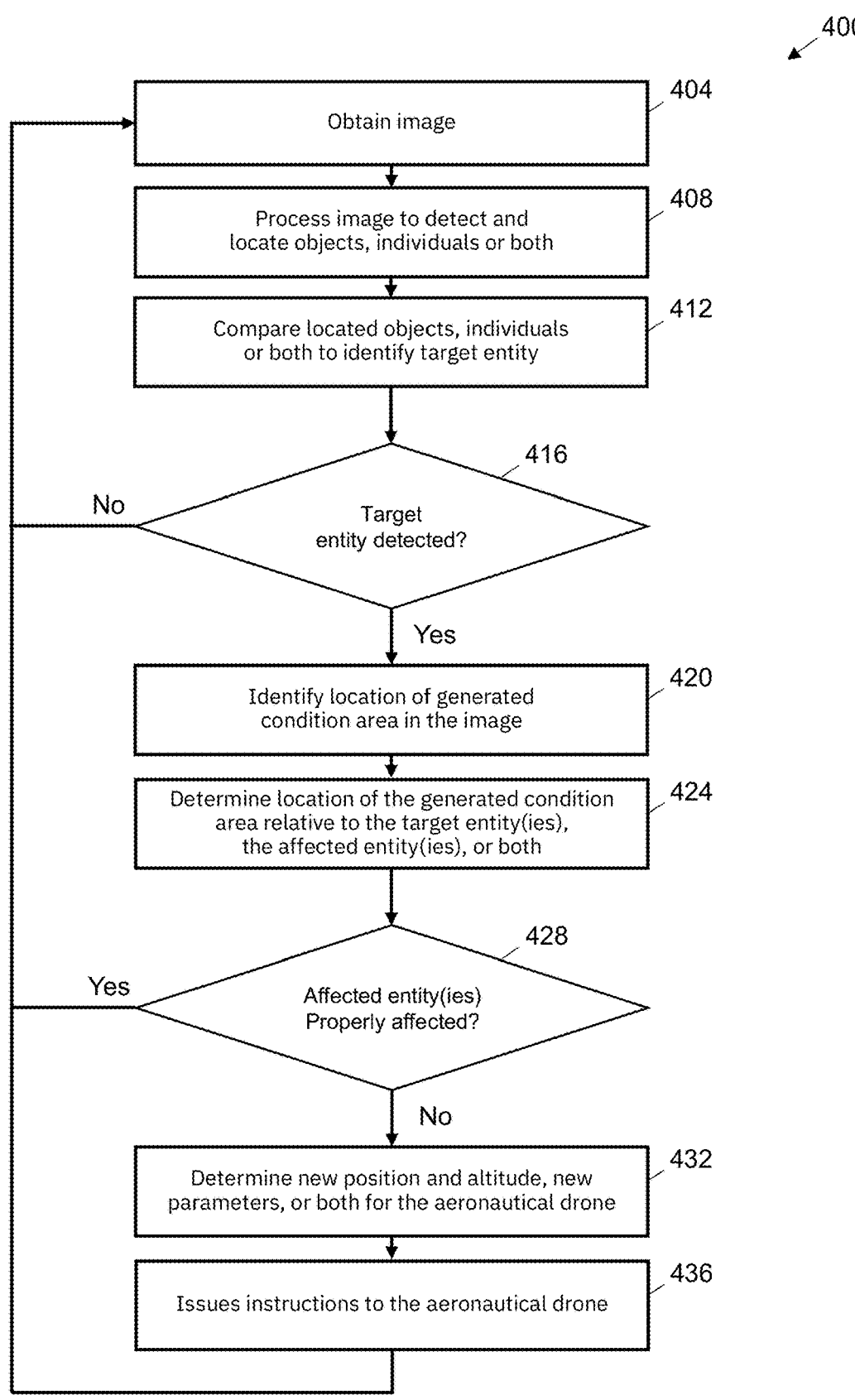
FIG. 4 illustrates a flowchart for an example method for controlling an intelligent protective drone system, in accordance with an example embodiment.

FIG. 4 is a flowchart for an example method 400 for controlling the intelligent protective drone system 100, in accordance with an example embodiment.

In one example embodiment, an image from the camera system 112 is obtained (operation 404). The image is processed by the image and sensor processing module 212 to detect and locate the objects and individuals, including the target entity(ies), in the image (operation 408). A corresponding size and location of the objects and individuals may also be determined.

The target recognition module 216 compares the identified objects and individuals to the target entity to determine if the target entity has been located. The target recognition module 216 also determines the relative geographical location of the target entity by, for example, analyzing the size and location of the target feature in the image (operation 412).

A test is performed to determine if the target entity has been detected (operation 416). If the target entity has not been detected, the method 400 repeats operation 404; otherwise, the image and sensor processing module 212 identifies the location of the generated condition area 120 provided by the environmental condition generator 108 within the image, e.g., the location of filtered light provided by the environmental condition generator 108, the location of artificial light provided by the environmental condition generator 108, the location of rainfall area provided by the environmental condition generator 108, and the like (operation 420). For example, changes in brightness, contrast, and the like may be used to locate a shadow created by the environmental condition generator 108, an area of brightness created by the environmental condition generator 108, and the like.

The generated conditions module 224 determines the relative geographical location of the generated condition area 120 provided by the environmental condition generator 108 in relation to the target entity, the affected entity(ies), or any combination of the above (operation 424). For example, the location of the generated condition area 120 of the environmental condition generator 108 within the image can be compared with the location of the affected entity(ies) in the image. The effect generated by the environmental condition generator 108 can also be characterized. For example, the effect can be characterized by the intensity of the light provided, the intensity of the simulated rainfall produced, and the like.

A test is performed to determine if the affected entity(ies) are properly affected by the environmental condition generator 108 (operation 428). For example, a determination may be made of whether filtered light is creating the lighting effect specified by a user as, for example, measured by the light meters, measured by an analysis of the captured images of the affected entity(ies), and the like. If the affected entity(ies) are properly affected by the environmental condition generator 108, the method 400 proceeds to operation 404 to process another image; otherwise, the target position module 220 determines a new position and altitude for the aeronautical drone 104, a new direction and angle for the environmental condition generator 108, new control settings for the environmental condition generator 108 or any combination of the above in order to position the generated condition area 120 created by the environmental condition generator 108 such that the affected entity(ies) are appropriately affected by the filtered light, wind, simulated rain, and the like (based on the geographical location of, for example, the shadow and the geographical location of the affected entity(ies)) (operation 432). The control settings for the environmental condition generator 108 and the location of the aeronautical drone 104 may be incrementally adjusted until the desired effect is attained. For example, if a spotlight effect on the target entity is desired, the spotlight may be incrementally moved until the target entity is illuminated by the environmental condition generator 108, as indicated in the image captured by the camera system 112. The guidance module 228 issues instructions to move the aeronautical drone 104, to reposition the functional units of the environmental condition generator 108, or both to the new configuration of the aeronautical drone 104, and the method 400 proceeds with operation 404.

Figure 5:
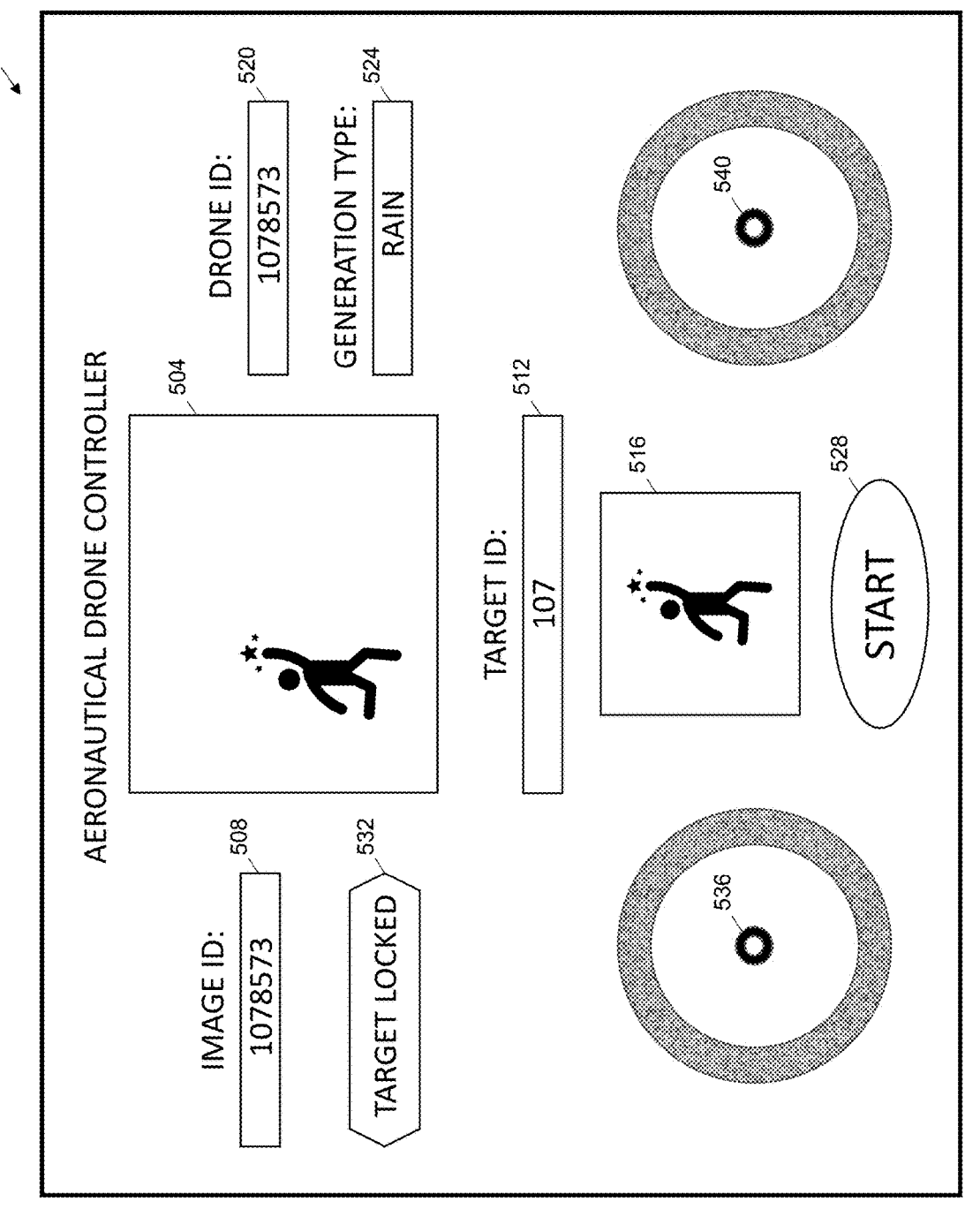
FIG. 5 illustrates an example user interface for configuring an intelligent protective drone system, in accordance with an example embodiment.

FIG. 5 illustrates an example user interface 500 for configuring the intelligent protective drone system 100, in accordance with an example embodiment. The user interface 500 may be generated by, for example, the user interface module 208.

As illustrated in FIG. 5, the user interface 500 comprises an image identifier field 508, a target identifier field 512, a target entity window 516, a drone identifier field 520, a generation type field 524, and a start button 528. A target entity icon 532 indicates when the tracking and guidance module 116 has locked onto the target entity. The drone identifier field 520 identifies the aeronautical drone 104 that is to be configured. (In environments with a plurality of aeronautical drones 104 operating in the same geographical area, the drone identifier field 520 identifies the aeronautical drone 104 that is to be configured via the user interface 500.) The target identifier field 512 is used to identify a target entity to be tracked by the aeronautical drone 104. For example, a user may select one of a plurality of candidate target entities from a library of target entities. An image of the selected target entity may be displayed in the target entity window 516. Similarly, the image identifier field 508 may be used to select an image of an object or other type of target entity that is to be tracked by the aeronautical drone 104. The selected image may be displayed in the target entity window 516. The generation type field 524 is used to identify the type of environmental element(s) (e.g., filtered natural light, artificial light, wind, rain, snow, fog and the like) that the environmental condition generator 108 is to generate.

A video display 504 allows a user to view the image captured by the camera system 112 of the aeronautical drone 104. The aeronautical drone 104 may be controlled by the user to initially position the aeronautical drone 104 using joysticks 536, 540 such that the captured image includes the target entity that is to be tracked. The joystick 536 may be used to control the altitude of the aeronautical drone 104, and the joystick 540 may be used to control the latitude and longitude of the aeronautical drone 104. In one example embodiment, an object or individual displayed in the image of the video display 504 may be selected using a touch screen, and the selected object or individual may be set as the target entity. In addition, the parameters controlling the environmental condition generator 108 may be manually set by the user. Once the aeronautical drone 104 is properly positioned and the target entity has been identified and locked onto by the tracking and guidance module 116, the start button 528 may be selected and the guidance module 228 assumes control of the aeronautical drone 104 and maintains the proper position of the aeronautical drone 104 in relation to the target entity. The guidance module 228 also activates the target entity icon 532 to indicate that the tracking and guidance module 116 has locked onto the target entity. The aeronautical drone 104 will track and follow the target entity. In one example embodiment, the generated conditions module 224 monitors the generated condition area 120 and adjusts the parameters of the environmental condition generator 108, the position and/or orientation of the aeronautical drone 104, and the like to maintain the effect attained by the manual settings. For example, the generated conditions module 224 may adjust the parameters of the light filter of the environmental condition generator 108 to maintain the same lighting effect as the aeronautical drone 104 moves across the landscape.

Although certain examples are shown and described here, other variations exist and are within the scope of the invention. It will be appreciated, by those of ordinary skill in the art, that any arrangement that is designed or arranged to achieve the same purpose may be substituted for the specific embodiments shown. This application is intended to cover any adaptations or variations of the example embodiments of the invention described herein. It is intended that this invention be limited only by the claims, and the full scope of equivalents thereof.

Example Mobile Device

Figure 6:
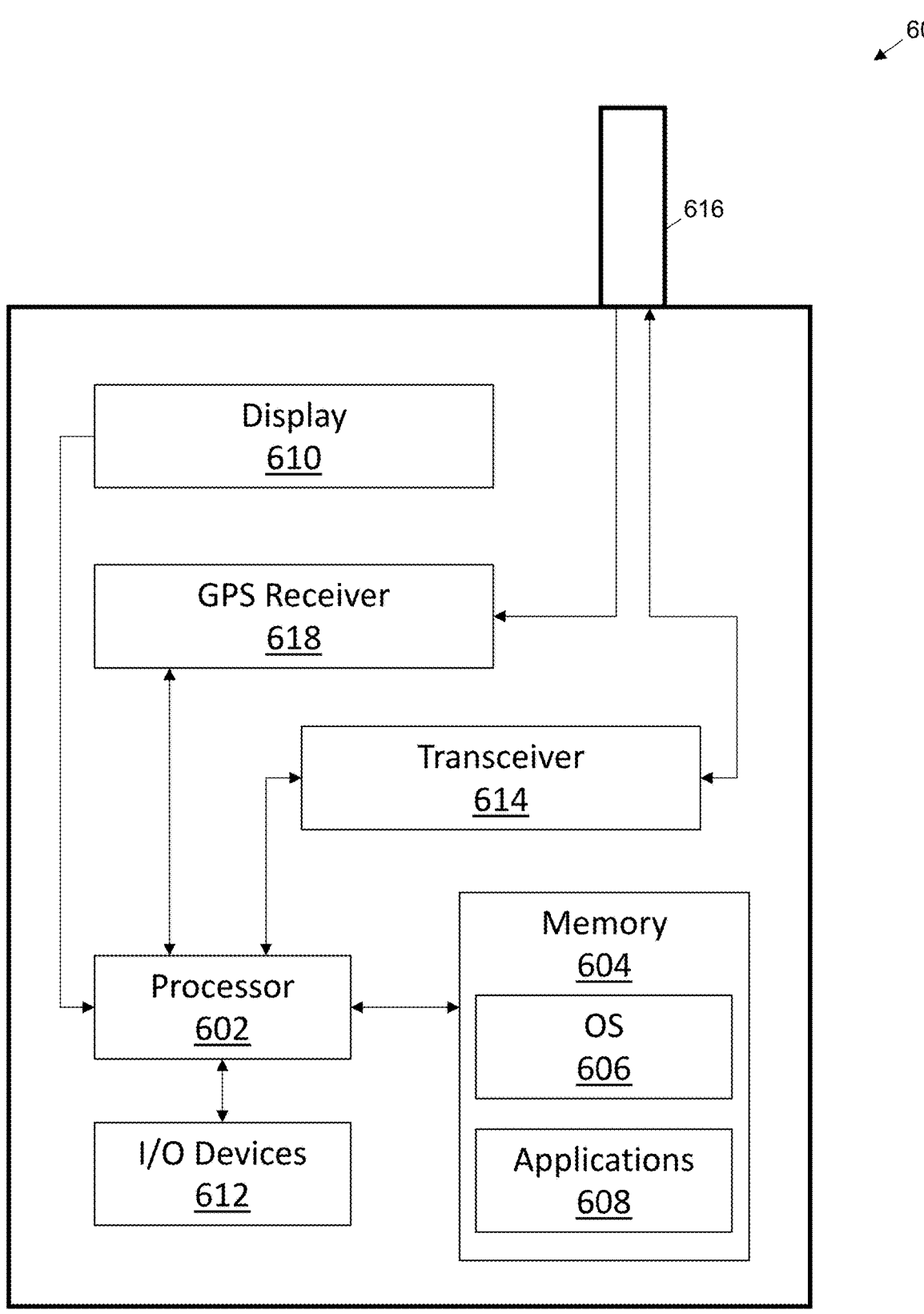
FIG. 6 is a block diagram illustrating an example mobile device, according to an example embodiment.

FIG. 6 is a block diagram illustrating an example mobile device 600, according to an example embodiment. The mobile device 600 may include a processor 602. The processor 602 may be any of a variety of different types of commercially available processors suitable for mobile devices (for example, an XScale architecture microprocessor, a microprocessor without interlocked pipeline stages (MIPS) architecture processor, or another type of processor 602). A memory 604, such as a random access memory (RAM), a flash memory, or another type of memory, is typically accessible to the processor 602. The memory 604 may be adapted to store an operating system (OS) 606, as well as application programs 608, such as a mobile location enabled application that may provide location-based services (LBSs) to a user. The processor 602 may be coupled, either directly or via appropriate intermediary hardware, to a display 610 and to one or more input/output (I/O) devices 612, such as a keypad, a touch panel sensor, a microphone, and the like. Similarly, in some embodiments, the processor 602 may be coupled to a transceiver 614 that interfaces with an antenna 616. The transceiver 614 may be configured to both transmit and receive cellular network signals, wireless data signals, or other types of signals via the antenna 616, depending on the nature of the mobile device 600. Further, in some configurations, a GPS receiver 618 may also make use of the antenna 616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 7:
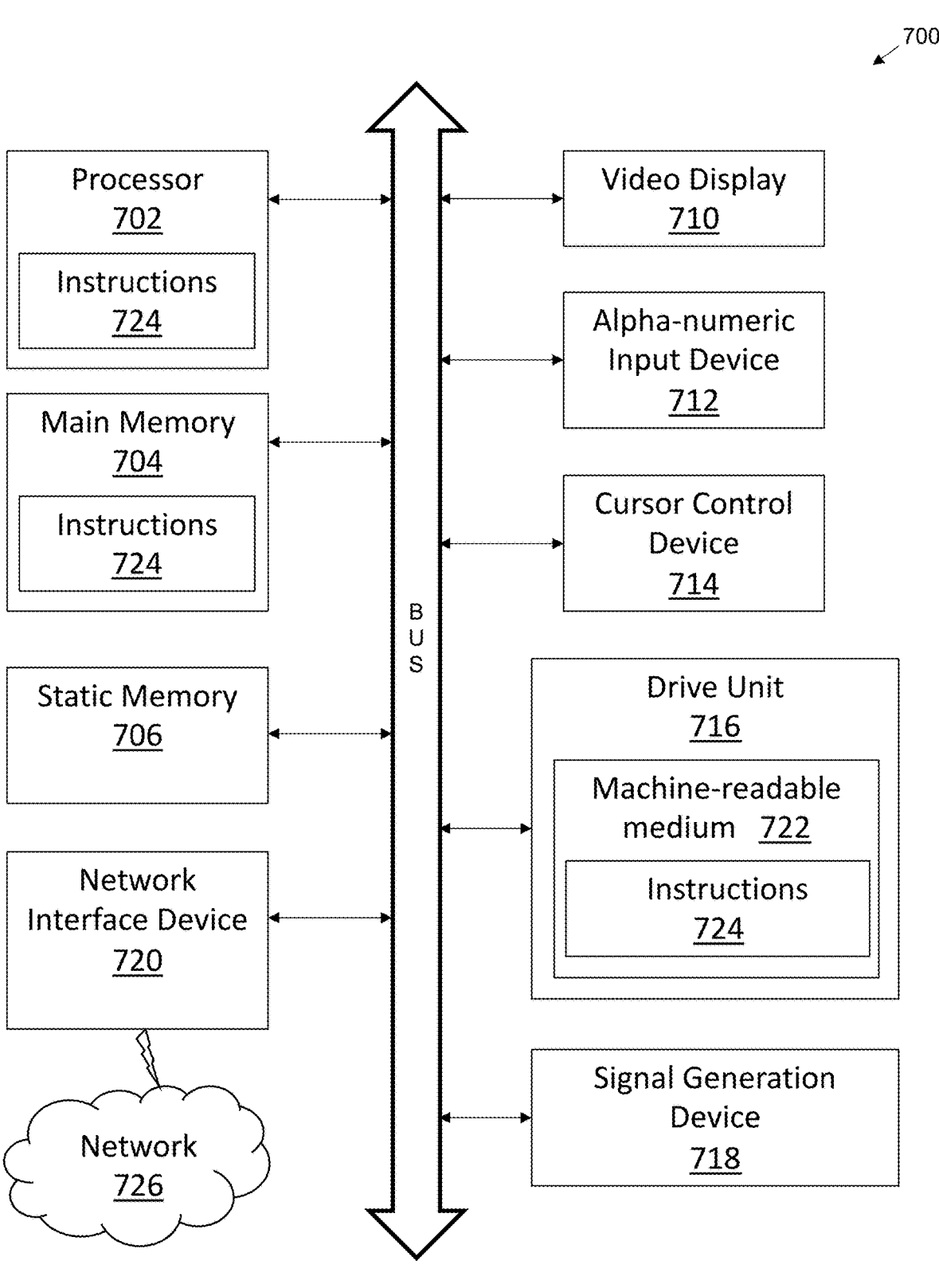
FIG. 7 is a block diagram of a machine within which instructions may be executed for causing the machine to perform any one or more of the methodologies discussed herein.

FIG. 7 is a block diagram of a machine in the example form of a computer system 700 within which instructions may be executed for causing the machine to perform any one or more of the methodologies discussed herein. In one example embodiment, the machine may be the example apparatus 200 of FIG. 2 for controlling the aeronautical drone 104. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a drive unit 716, a signal generation device 718 (e.g., a speaker), and a network interface device 720.

Machine-Readable Medium

The drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media 722. The instructions 724 may also reside within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more data structures or instructions 724. The term "machine-readable medium" shall also be taken to include any tangible medium that is capable of storing, encoding, or carrying the instructions 724 for execution by the machine and that cause the machine to perform any one or more of the methodologies of the present invention, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., hypertext transfer protocol (HTTP)). Examples of communications networks 726 include a local area network (LAN), a wide area network (WAN), the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 724 for execution by the machine, and includes digital or analog communications signals or other intangible media to facilitate communication of such instructions 724.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, the apparatus comprising:

an aeronautical drone;

an environmental condition generator configured to generate an environmental effect in a specified condition area around a target entity;

a camera system configured to capture an image of an environment near the aeronautical drone;

an image and sensor processing module configured to identify the target entity by processing the image captured by the camera system and to identify a generated condition area of the environmental effect, wherein the generated condition area is an area where the environmental effect is in effect;

a tracking and guidance module configured to track the target entity and determine a location for the aeronautical drone that creates the environmental effect in the specified condition area at a specified location and positions the generated environmental effect around the target entity; and a generated conditions module configured to identify a geographical location of the generated environmental effect provided by the environmental condition generator in relation to the target entity.

2. The apparatus of claim 1, further comprising one or more light meters configured to monitor the environmental effect generated by the aeronautical drone using the environmental condition generator.

3. The apparatus of claim 1, wherein the environmental condition generator further comprises a rain generator configured to adjust a direction of fluid and a volume of the fluid flowing from the aeronautical drone to position the generated environmental effect around the target entity.

4. The apparatus of claim 1, further comprising one or more light filters configured to adjust an intensity of light illuminating the generated condition area around the target entity.

5. A method comprising:

obtaining an identification of a specified condition area for an environmental effect around a target entity;

capturing an image of an environment near an aeronautical drone;

identifying the target entity by processing the captured image;

tracking the target entity and determining a location for the aeronautical drone that creates the environmental effect in the specified condition area at a specified location and positions the generated environmental effect environment effect around the target entity;

generating the environmental effect in the specified condition area; and identifying a geographical location of the generated condition area of the environmental effect, wherein the generated condition area is an area where the environmental effect is in effect.

6. The method of claim 5, wherein the determining the location for the aeronautical drone determines a target location for the aeronautical drone that generates the environmental effect in the specified condition area of a specified size.

7. The method of claim 5, further comprising obtaining sensor data from one or more sensors and wherein the identifying the geographical location of the generated condition area in relation to the target entity is based on the sensor data.

8. The method of claim 5, further comprising adjusting a specified effect in the generated condition area generated by the aeronautical drone based on measurements of a light meter.

9. The method of claim 5, further comprising positioning the aeronautical drone to shield the target entity from rain.

10. The method of claim 5, further comprising spraying a liquid from the aeronautical drone, wherein the spraying the liquid comprises adjusting a direction of the liquid and a volume of the liquid sprayed from the aeronautical drone to conform to the specified condition area.

11. The method of claim 5, further comprising setting parameters of the environmental condition generator on the aeronautical drone to adjust a size of the generated condition area.

12. The method of claim 5, further comprising adjusting the environmental condition generator on the aeronautical drone based on measurements of reflected light to alter an intensity of light and a location of the light on the target entity.

13. The method of claim 5, wherein the identifying the geographical location of the generated condition area of the environmental effect further comprises performing image processing on an image of the generated condition area.

14. The method of claim 5, further comprising performing image processing on an image of the generated condition area to detect a size of the generated condition area generated by the aeronautical drone.

15. A computer system comprising:

a processor; and memory to store instructions that, when executed by the processor, cause the processor to perform operations comprising:

obtaining an identification of a specified condition area for an environmental effect around a target entity;

capturing an image of an environment near an aeronautical drone;

identifying the target entity by processing the captured image;

tracking the target entity and determining a location for the aeronautical drone that creates the environmental effect in the specified condition area at a specified location and positions the generated environmental effect around the target entity;

generating the environmental effect in the specified generated condition area; and identifying a geographical location of the condition area of the environmental effect, wherein the generated condition area is an area where the environmental effect is in effect.

16. The computer system of claim 15, the operations further comprising adjusting a specified effect in the generated condition area generated by the aeronautical drone based on measurements of a light meter.

17. The computer system of claim 15, the operations further comprising setting parameters of an environmental condition generator on the aeronautical drone to adjust a size of the generated condition area.

18. The computer system of claim 15, the operations further comprising adjusting an environmental condition generator on the aeronautical drone based on measurements of reflected light to alter an intensity of light and a location of the light on the target entity.

19. The computer system of claim 15, the operations further comprising performing image processing on an image of the generated condition area to detect a location of the generated condition area generated by the aeronautical drone.

\*    \*    \*    \*    \*